United States Patent
Archer et al.

(10) Patent No.: US 6,389,441 B1
(45) Date of Patent: May 14, 2002

(54) TWO DIMENSIONAL MOVING AVERAGE FILTER

(75) Inventors: Greg L. Archer; Larry W. Wilkinson, both of Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/322,550

(22) Filed: May 28, 1999

(51) Int. Cl.$^7$ .................................................. G06F 7/38
(52) U.S. Cl. ....................................................... 708/455
(58) Field of Search ................................... 708/202, 300, 708/304, 308, 445; 345/673; 348/421.1, 619

(56) References Cited

U.S. PATENT DOCUMENTS

| | | |
|---|---|---|
| 4,193,118 A | 3/1980 | Nash et al. |
| 4,783,660 A | 11/1988 | Pierce |
| 4,789,953 A | 12/1988 | Gerrath |
| 4,816,914 A * | 3/1989 | Ericsson ................... 348/405 |
| 4,918,742 A | 4/1990 | Simonds |
| 4,947,446 A | 8/1990 | Jutand et al. |
| 5,068,818 A | 11/1991 | Uramoto et al. |
| 5,163,100 A | 11/1992 | Mathieu et al. |
| 5,440,503 A | 8/1995 | Maruyama |
| 5,668,895 A | 9/1997 | Yamazaki et al. |
| 5,742,355 A * | 4/1998 | Haan et al. ................... 348/607 |
| 6,249,608 B1 * | 6/2001 | Ikeda et al. ................... 382/209 |

* cited by examiner

Primary Examiner—Chuong Dinh Ngo
(74) Attorney, Agent, or Firm—Peyton C. Watkins

(57) ABSTRACT

A two dimensional moving averaging filter is provided using a computational element coupled to a memory means which contains an electronic version of a two dimensional array of pixel values with N rows and M columns and a temporary memory buffer having a dimension of M columns by R+1 rows that is operatively coupled to receive data from the array. Each of the M columns within the temporary memory buffer is summed and the summated column values are placed into the "R+1" row of the temporary memory wherein a neighborhood filter is formed by secondly summing a predetermined number, "C", of the summated column values such that the neighborhood filter contains a summation for a neighborhood the pixel array values of "R" rows by "C" columns. The summated neighborhood is averaged by dividing by the number of elements within the neighborhood (R×C) to gain an averaged center to the neighborhood filter and this averaged center is placed into its representative position of the pixel value that is currently being filtered within the two dimensional array. The neighborhood filter is then moved to the next pixel position to be filtered by adding a new summated column value from the "R+" row of the temporary memory buffer to the neighborhood filter and subtracting an oldest summated column value within the R+1 row from the neighborhood filter. After processing an entire row, the oldest row is subtracted from the extra row summation and the next sequential row is added to the extra row.

25 Claims, 2 Drawing Sheets

TWO DIMENSIONAL MOVING AVERAGE FILTER

FIELD OF THE INVENTION

The present invention relates to the art of digital image processing, and more specifically, to the application of filters to arrays of pixels.

BACKGROUND OF THE INVENTION

There are numerous digital filtering techniques within the prior art that have taught various methods and devices that can be employed towards digital imaging. Among these are a number of one dimensional filters such as U.S. Pat. No. 5,668,895, entitled Digital Filter for Image Processing, which teaches the use of low precision bit-shifting calculations. This prior art design is a one dimensional filter that requires additional multiplication circuits and teaches an algorithm that weights the middle element to minimize the bit-shifting error. This prior art teaching has shortcoming in that the center weighting of the middle element does not match the strict definition of an average filter. Another prior art one dimensional filter taught by U.S. Pat. No. 5,068,818, entitled Hardware implemented Moving Average Processor, that is realistically applicable in hardware only and provides little usefulness for filtering data from two-dimensional data sources. Moreover, this prior art teaching is difficult to implement in software. Still another one dimensional prior art device is U.S. Pat. No. 4,193,118, entitled Low Pass Digital Averaging Filter which is useful in hardware upon analog signals and provides little usefulness towards two-dimensional digital data sources. Furthermore, this prior art teaching does not provide the versatility for the designer to implement the filter in hardware or software. There are numerous one-dimensional filters within the prior art that provide no assistance in towards two dimensional filtering.

Other prior art devices, such as U.S. Pat. No. 4,918,742, entitled Image Processing Using Multipass Convolution with Small Kernels describes a hardware convolution circuit which is not optimized for performing a high-speed average filter. Still other prior art devices, such as U.S. Pat. No. 4,947,446, entitled Method and Circuit for Filtering Signals Representative of a Picture presents a hardware design for performing a convolution on a two-dimensional data source is also not optimized for applying a high speed average filter on a two-dimensional data-source.

Yet, still another prior art device is described in U.S. Pat. No. 5,440,503, entitled Digital Filtering Circuit Operable as a Three Stage Moving Average Filter. This patent describes a design for oversampling and integrating a signal to determine a moving average, however, does not teach a process for optimizing the number of additions, subtractions, and division operations to perform a moving average.

It should be readily apparent from the above discussion, that there remains a need within the prior art for a process that is useful for processing moving averages and can be optimized for that purpose.

SUMMARY OF THE INVENTION

The present invention addresses the foregoing shortcomings within the prior art by providing a two dimensional moving averaging filter that can efficiently average row and columns within a matrix. By reducing the number of calculations required, the concepts of the present invention allow a filter that can provide neighborhood averaging for a pixel more efficiently than prior art devices.

The preferred embodiment employs a computational element that operates on a two dimensional array of matrix values comprising N rows and M columns. A memory, within the computational element, is configured to contain a temporary memory buffer from selected portions of the matrix. The matrix positions placed into the temporary memory buffer are selected to be a subset of the entire matrix. In the preferred embodiment, employing an M×N matrix, the dimensions of the temporary memory buffer is M columns by R+1 rows, where R is some value less than N. The value R is pre-selected in accordance with desired parameters for the averaging filter that are based upon digital imaging criteria for neighborhood pixel averaging. Values for an initial set of R rows are loaded into the temporary memory and an extra row of memory locations is provided by the temporary memory. This extra row is used to hold summated values that are to be averaged. Each of the M columns within the temporary memory is summed and that summated value is placed within the extra row of the temporary memory. The summated values contained within the extra row are then used to define the neighborhood average by summing a predefined number of values from the extra row and dividing by the neighborhood size. The neighborhood employed by the preferred embodiment has the same number of rows as the temporary memory but fewer column representations. The average value for the neighborhood is placed into the image array corresponding to the center position for the neighborhood.

The summated value of the neighborhood is modified by moving one column at a time across the extra row subtracting the oldest sum position and adding the next sum position to the current value of the neighborhood. The average value for the neighborhood is then recalculated and this average value is placed in the corresponding position in the imaging array. After a row is completely filtered, the oldest row is removed from the temporary memory and is replaced by the next sequential row in the imaging array. This process is repeated until the entire image array is processed. The foregoing process illustrates a method and apparatus of filtering an image array that requires a significantly reduced amount of process steps. It will also be readily apparent to those skilled in the relevant art, that the filtering method and apparatus of the present invention can be employed upon any matrix and not only on imaging arrays.

These and other objects of the present invention are provided by the method and apparatus of filtering a two dimensional array comprising of: an electronic version of a two dimensional array of values comprising N rows and M columns; defining a filter neighborhood that is a subset of the two dimensional array having a characteristic of C columns and R rows such that R and C are odd values; duplicating a first set of R rows into a temporary memory buffer; firstly summating the first set of R rows into an extra row having a dimension of M columns; secondly summating a first set of C columns of the extra row into a first summation; averaging the first summation by dividing by the number of elements within the neighborhood filter (R×C); replacing the averaged center into its representative position into the electronic version of the two dimensional array; subtracting the oldest extra row column sum in the secondly summating step and adding the next column sum to occur in the extra row that has not been used in the first summation and repeating the averaging and recalculation until all M columns have been processed; replacing within the firstly summating step the values for the oldest row in the temporary memory buffer with values for the next row in the imaging array and continuing to calculate the averaged center for the set of R rows.

DETAILED DESCRIPTION OF THE INVENTION

Figure 1:
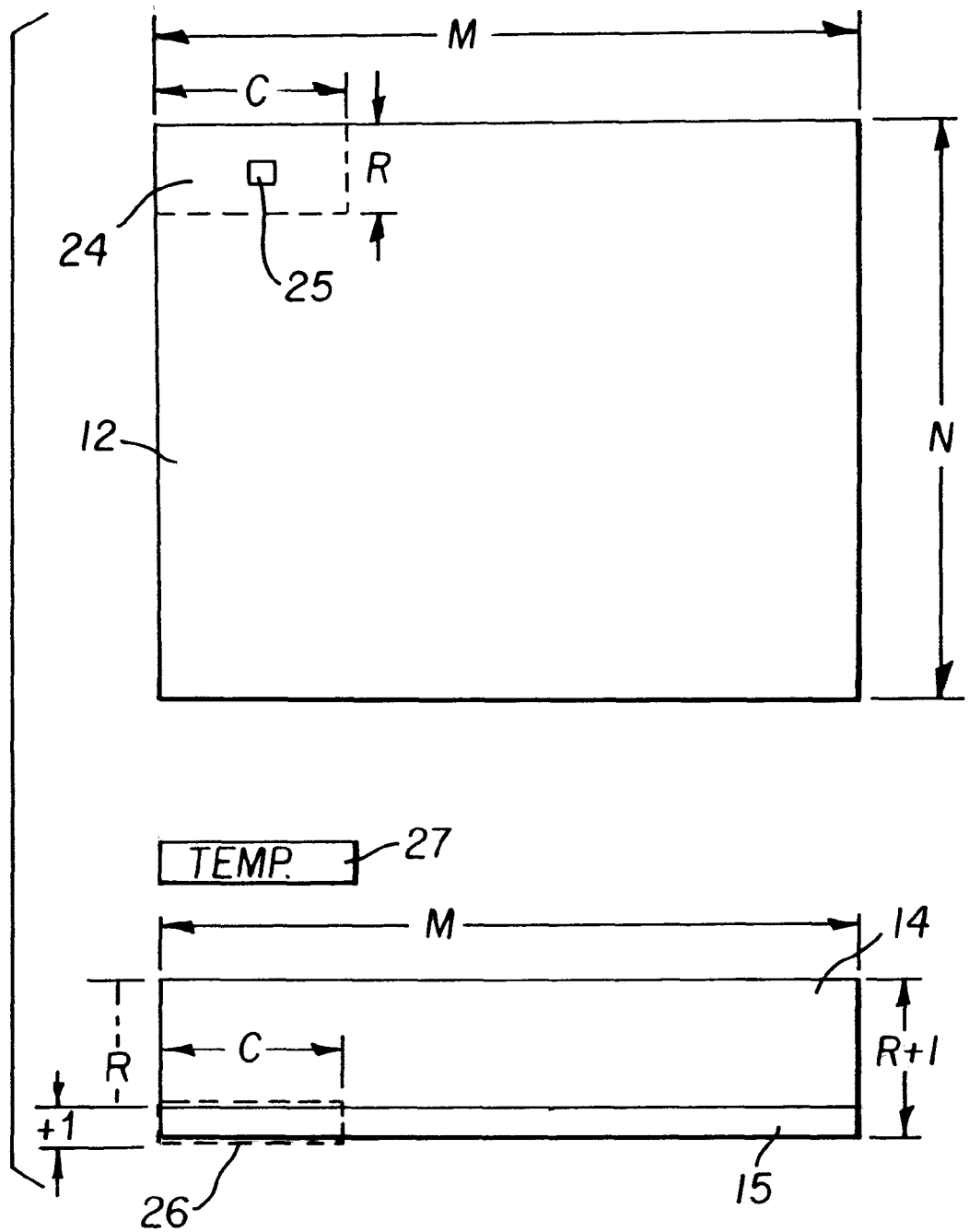
FIG. 1 is a block diagram of the functional workings of the present invention.

Referring to FIG. 1, a two-dimensional moving average filter is illustrated that can efficiently average a filter neighborhood within a matrix. By reducing the number of calculations required to perform the averaging process, the present invention provides a filter that can provide neighborhood averaging for a pixel in a dynamic and more efficient manner than prior art devices.

An array 12 of pixel data is contained within a computational element 10 and a temporary memory buffer 14, configured to receive selected portions of the array 12, is controlled by the computational element 10. The matrix positions from array 12 that are placed within temporary memory buffer 14 are a selected subset of the array 12 and selected to represent the current rows of the pixel data that are being processed by computational element 10. In the preferred embodiment employing an M×N matrix, the dimensions of the temporary memory buffer 14 are M columns by R+1 rows, where R is some value less than N. The value R is pre-selected in accordance with desired parameters for the averaging filter that are based upon digital imaging criteria for neighborhood pixel averaging. The pixel data values for all M columns of an initial set of R rows are loaded into the temporary memory buffer 14. An extra row 15 of memory locations is provided in combination with the temporary memory buffer 14 to hold summated values for each of the M columns that are contained within the temporary memory buffer 14. A filter neighborhood 24 is created by selecting a portion, referred herein as C, from the summated values contained within the extra row 15. By summing the C values from the extra row 15, effectively a neighborhood 24 C columns by R rows has been summated. The average of the neighborhood 24 is then used to represent the current pixel location 25 being processed and placed within array 12 in the position of the current pixel location 25.

Still referring to FIG. 1, the filter neighborhood 24 in the preferred embodiment has the same number of rows as the temporary memory buffer 14 but fewer column representations. The dimensions of the filter neighborhood 24 are C columns by R rows as shown in FIG. 1. The filter neighborhood 24, in the preferred embodiment, is created by employing temp register 27 to store a summated version of the selected group of C columns within extra row 15. This selected group is "C" columns wide and effectively sums all the column values for R rows that will be averaged to form the center 25 of the filter neighborhood 24. The filter neighborhood 24 illustrated in FIG. 1 is the initial position for the preferred embodiment described, herein.

The filter neighborhood 24 is modified by moving the temp window 26 one position at a time across the extra row 15, subtracting the oldest position of the temp window 26 and adding the next position from the extra row 15 to the temp register 27. The average value for the filter neighborhood 24 is then recalculated by calculating the temp register 27 divided by the filter neighborhood size (R×C). This average value is placed in the imaging array 12 one position removed from the previous. After a row is completely filtered, the oldest row is subtracted from the extra row 15 and is replaced in the temporary memory buffer 14 by the next sequential row to be filtered and added to extra row 15. This process is repeated until the entire image array 12 is filtered. The foregoing process illustrates a method and apparatus of filtering an image array 12 that requires a significantly reduced amount of calculations to perform the required process steps. It will also be readily apparent to those skilled in the relevant art, that the filtering method and apparatus of the present invention can be employed upon any matrix and not only on imaging arrays.

Figure 2:
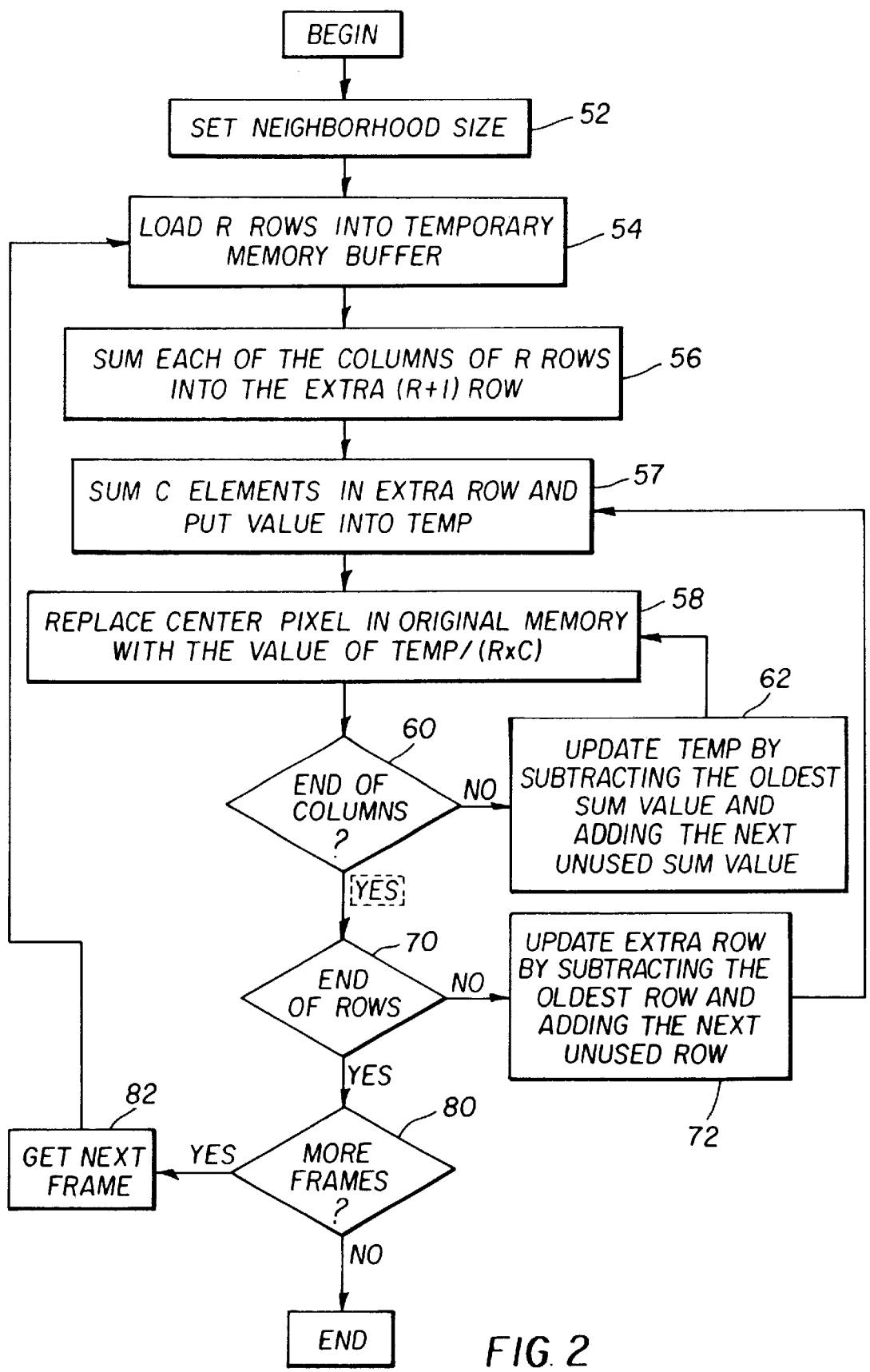
FIG. 2 is a flow diagram illustrating the operation of the present invention as seen in FIG. 1.

The steps required for implementing the present invention are illustrated in the flowchart shown in FIG. 2, taken in conjunction with FIG. 1. The preferred embodiment, as seen in FIG. 1, can be part of any digital, computational element 10 that has the ability to perform operations on a two dimensional array 12 of matrix values comprising N rows and M columns. Set neighborhood size 52 determines the number of pixel values that are going to be employed as the neighborhood the system, which is referred to herein as R rows by C columns. The function of Load R Rows into Temporary Memory 54 initializes the temporary memory buffer 14 by placing the first set of R rows into the temporary memory buffer 14 as described by Equation 1.

$$\text{Buffer}_{ij} = \text{Matrix}_{ij} \qquad \text{Equation 1:}$$

with j=1→R;i=1→M
and Buffer representing temporary memory buffer 14.

To initialize the Extra Row 15, Equation 2 is performed by computational element 10 the step Sum Each of the Columns of R Rows into Extra Row 56 perform.

i=1→M $$\text{Equation 2:} \quad ER_i = \sum_{j=1}^{R} \text{Buffer}_{ij}$$

To load or initialize temp register 27, sum the first C column sums of the Extra Row 15 in Equation 3 below.

$$\text{Equation 3:} \quad temp = \sum_{i=1}^{C} ER_i$$

Equation 4 is applied during the program loop End of Columns 60 and Change Leftmost "C" value With Rightmost "C" Summated Value 62 to process the data within temp 27 in a manner that effectively compensates for edge effects that can occur around the periphery of the matrix of array 12.

$$\text{Equation 4:} \quad temp = temp + ER_{\left(i + \frac{C+1}{2}\right)} - ER_{\left(i - \frac{C-1}{2}\right)}$$

with $$i = \frac{C+1}{2} \to M - \frac{C+1}{2}; j = k - \frac{R+1}{2}$$

let k=R+1→N.

Equation 4 provides a means for processing the data contained within the temporary memory buffer 14 while allowing for edge effects. Edge effects are determined by the size of the neighborhood filter 24 that is employed. The column peripheries of the array 12 that are within C/2 of current pixel value within array 12 that is being filtered are not valid for use within the neighborhood filter 24. In addition, the row peripheries within R/2 of the edge of matrix array 12 are not valid.

Each value for temp 27 is averaged and placed in the position of the current pixel being processed 25 which is the same as the center of the neighborhood filter 24, within the preferred embodiment. To find new Matrix value for each new temp 27 value, Equation 5 is implemented by computational element 10 as indicated by program blocks Sum "C" Elements 57 and Divide Sum By (R×C) To Find Average and Replace Center Pixel in Original Memory With Average 58.

$$\text{Matrix}_{ij} = \text{temp}/(R \times C) \quad \text{Equation 5:}$$

when $$\left(\frac{R+1}{2} \le j \le N - \frac{R-1}{2}\right) \text{ and } \left(\frac{C+1}{2} \le i \le M - \frac{C-1}{2}\right)$$

to avoid edge effects;

otherwise $\text{Matrix}_{ij} = \text{Matrix}_{ij}$

To modify Buffer and ER for each new row, computational element 10 implements Equations 6a, 6b and 6c are performed by the program loop of End of Rows 70 and Subtract Top Row From Extra Row and add Next Row 72.

i=1→M k represents next row $$ER_i = ER_i - \text{Buffer}_{i(k \bmod R)} \quad \text{Equation 6a}$$

$$\text{Buffer}_{i(k \bmod R)} = \text{Matrix}_{ik} \quad \text{Equation 6b}$$

$$ER = ER_i + \text{Matrix}_{ik} \quad \text{Equation 6c}$$

where (k mod R)=remainder of k/R

After all the rows have been processed, More Frames 82 will decide if there are any additional frames remaining to be processed and run Get next frame 82 if there are. Otherwise, the process is terminated.

An example of the operation of the moving filter as envisioned by the present invention follows. In this example the pixel value being processed is that of the second row, third column position within the array. The size of the neighborhood filter selected for the example is R=3; and C=5. The entire array is presented below.

| 20 | 23 | 24 | 23 | 19 | 21 | 23 | 23 | 22 |
|----|----|----|----|----|----|----|----|----|
| 23 | 22 | 22 | 18 | 20 | 19 | 24 | 21 | 19 |
| 24 | 19 | 23 | 17 | 22 | 22 | 21 | 23 | 22 |
| 21 | 22 | 23 | 22 | 21 | 20 | 19 | 19 | 20 |
| 22 | 21 | 20 | 20 | 21 | 22 | 23 | 23 | 22 |

For the above example employing a neighborhood filter of R=3 and C=5, to calculate the filtered value for the third element in the second row (3, 2) the extra row values are summed in accordance with Equation 2 for each of the columns in the first three rows. Therefore, with i=1→M.

$$\text{Equation 2:} \quad ER_i = \sum_{j=1}^{R} \text{Buffer}_{ij}$$

The results of these summations yield as extra row (ER)

$$ER = \begin{array}{cccccccc} 67 & 64 & 69 & 58 & 61 & 62 & 68 & 67 & 63 \end{array}$$

By summing the values of the extra row in accordance with Equation 3

$$\text{Equation 3:} \quad \text{temp} = \sum_{i=1}^{C} ER_i$$

The temp register 27 holds a value that is equal to the summated total of the neighborhood, therefore, temp=319. To arrive at the filtered value which is then placed back into the array at the $\text{Matrix}_{3,2}$ position, the 319 value is simply divided by the number of elements in the neighborhood (R×C). There, the value inserted is $\text{Matrix}_{3,2}=319/(3\times 5)=21$.

To process the next pixel value within the array. The only mathematical operations that need to be performed are the addition, to the temp register, of the next value to the right in the extra row (ER) that has not been included in the temp register summation and the subtraction of the leftmost ER value that was already included in the previous temp register calculation. This new temp register value calculation is shown below.

temp=temp+ER(6)−ER(1) or temp=319+62−67→temp=314

Once all the valid pixel values within a row are processed, the next row is filtered by subtracting the top most row of the array from the extra row summations, and adding the next sequential row from the array to the extra row. An example of this process is shown below.

$$\begin{array}{rccccccccc}
ER = & 67 & 64 & 69 & 58 & 61 & 62 & 68 & 67 & 63 \\
- & 20 & 23 & 24 & 23 & 19 & 21 & 23 & 23 & 22 \\
+ & 21 & 22 & 23 & 22 & 21 & 20 & 19 & 19 & 20 \\
\\
ER = & 68 & 63 & 68 & 57 & 63 & 61 & 64 & 63 & 61
\end{array}$$

The first valid pixel value is then processed, as previously described taking edge effects into account, and the entire row is processed moving across one pixel at a time. All the rows in the array are processed in this manner until the entire array is filtered.

The foregoing discussion has detailed the most preferred embodiment known to the inventor, other embodiments that are obvious variations will be readily apparent to those skilled in the art, accordingly, the scope of the present invention should be measured by the appended claims.

What is claimed is:

1. A two dimensional moving averaging filter comprising:
   a computational element having memory means containing a two dimensional array of values comprising N rows and M columns;
   a temporary memory buffer having a dimension of M columns by R+1 rows that is operatively coupled to receive data from the array;

means for summing each of the M columns and placing a summated column value into the "R+1" row of the temporary memory;

a neighborhood filter formed by summing a predetermined number, "C", of the summated column values such that the neighborhood filter contains a first summation for the array values of "R" rows by "C" columns;

means for averaging the first summation by dividing by (R×C) to gain an averaged center to the neighborhood filter;

means for placing the averaged center into its representative position in the two dimensional array in the memory means; and means for moving the neighborhood filter to a next position by adding a new summated column value from the "R+1" row of the temporary memory buffer to the neighborhood filter and subtracting an oldest summated column value within the R+1 row from the neighborhood filter.

2. The invention of claim 1 where "C" and "R" are odd values that are, respectively, less than M and N.

3. The invention of claim 1 further comprising means for detecting a predefined end of a row within the M×N array.

4. The invention of claim 3 wherein the predefined end is a location defined by M−((C−1)/2).

5. The invention of claim 3 wherein the predefined end of frame is a location defined by N−((R−1)/2).

6. The invention of claim 1 further comprising means for incrementing to a next row in the M×N array.

7. The invention of claim 6 wherein the next sequential row is placed into temporary memory where the oldest row formerly existed.

8. The invention of claim 1 wherein the neighborhood filter has a characteristic of C columns and R rows such that R and C are odd values.

9. The invention of claim 1 further comprising means for detecting a predefined end of a frame within the M×N array.

10. A method of filtering a two dimensional array comprising the steps of:

providing a electronic version of a two dimensional array of values comprising N rows and M columns that is operatively coupled to a temporary memory buffer having "R+1" rows by M columns;

duplicating a first set of R rows into the temporary memory buffer;

calculating a first summation of R rows for each of the M columns within the temporary memory buffer and placing the first summation into the "R+1" row of the temporary memory buffer;

creating a neighborhood filter that is a second summation of "C" elements within the temporary memory buffer, the second summation of the neighborhood filter, thereby, containing the summated values of C columns by R rows of the array;

averaging the second summation by dividing by the number of elements within the neighborhood filter (R×C) to create an averaged center;

placing the averaged center into its representative position within the electronic version of the two dimensional array; and moving the neighborhood filter to a next position by adding a new summated column value from the "R+1" row of the temporary memory buffer to the neighborhood filter and subtracting an oldest summated column value within the R+1 row from the neighborhood filter and repeating the averaging and placing step until all M columns have been processed.

11. The method of claim 10 further comprising the step of replacing an oldest row in the first summation within values for a next row to be sequentially processed within the step of calculating to create a next, first summation within the calculating step and continuing with the remaining steps to calculate the averaged center for the set of R rows.

12. The method of claim 10 further comprising the step of detecting a predefined end of a row within the M×N array.

13. The method of claim 12 wherein the step of detecting further comprises indicating the predefined end when M−((C−1)/2).

14. The method of claim 12 further comprising the step of incrementing to the next row within the M×N array when the predefined end is detected.

15. The method of claim 10 wherein the next sequential row into temporary memory is placed where the oldest row formerly existed.

16. The method of claim 10 wherein the step of creating a neighborhood filter further comprises a characteristic of C columns and R rows such that R and C are odd values.

17. A method of filtering a two dimensional array comprising the steps of:

providing an electronic version of a two dimensional array of N rows by M columns that is operatively coupled to computational element, the computational element being coupled to a temporary memory buffer having M columns and "R+1" rows, where "R+1" is a value less than N;

selecting a subset of R row from the two dimensional array that is representative of a current row being filtered and duplicating a subset of R rows from the two dimensional array into the temporary memory buffer leaving a single row unfilled within the temporary memory buffer;

creating a first summation of all R rows for each of the M columns within the temporary memory buffer and placing the first summation into the single row of the temporary memory buffer;

generating a neighborhood filter that is a second summation of "C" elements of the single row within the temporary memory buffer;

averaging the second summation by dividing by a value R×C to create an averaged center;

placing the averaged center into its representative position within the electronic version of the two dimensional array; and repeating the creating, generating, averaging and placing steps for each desired value in the current row being processed.

18. The method of claim 17 further comprising the step of incrementally filtering a predetermined number of rows within the two dimensional array.

19. The method of claim 18 wherein the step of incrementally filtering the predetermined number of rows further comprises as the predetermined number R+1.

20. The method of claim 17 wherein the step of selecting further comprises the step of initially selecting as a first subset one that begins with ((R+1)/2).

21. The method of claim 17 further comprising the step of identifying a last row to be filtered.

22. The method of claim 21 wherein the step of identifying further comprises identifying as the last row, row (N−(R−1)/2).

23. The method of claim 17 wherein the step of repeating further comprises the step of sequentially filtering adjacent values within the current row.

24. The method of claim 23 wherein the step of sequentially filtering adjacent values further comprises as an initial value in the current row (C+1)/2.

25. The method of claim 24 wherein the step of sequentially filtering adjacent values further comprises as a final value (M−(C−1)/2).

* * * * *

UNITED STATES PATENT AND TRADEMARK OFFICE
CERTIFICATE OF CORRECTION

PATENT NO.    : 6,389,441 B1  
DATED         : May 14, 2002  
INVENTOR(S)   : Greg L. Archer et al.

It is certified that error appears in the above-identified patent and that said Letters Patent is hereby corrected as shown below:

<u>Title page,</u>
Item [57], ABSTRACT,
Line 22, please replace ""R+"" with -- "R+1" --.

Signed and Sealed this

Twenty-eighth Day of October, 2003

JAMES E. ROGAN
*Director of the United States Patent and Trademark Office*